(12) United States Patent  
Ahne et al.

(10) Patent No.: US 9,109,939 B2  
(45) Date of Patent: Aug. 18, 2015

(54) CAPACITIVE SUPPLY LEVEL SENSING CIRCUIT AND METHOD

(75) Inventors: Adam Jude Ahne, Lexington, KY (US); Raymond Jay Barry, Lexington, KY (US)

(73) Assignee: Lexmark International, Inc. KY (US)

( * ) Notice: Subject to any disclaimer, the term of this patent is extended or adjusted under 35 U.S.C. 154(b) by 813 days.

(21) Appl. No.: 13/432,693

(22) Filed: Mar. 28, 2012

(65) Prior Publication Data

US 2013/0257455 A1    Oct. 3, 2013

(51) Int. Cl.
*H02M 1/14* (2006.01)
*G01F 23/26* (2006.01)

(52) U.S. Cl.
CPC .................................. *G01F 23/266* (2013.01)

(58) Field of Classification Search
CPC .................................................. G01F 23/266
See application file for complete search history.

(56) References Cited

U.S. PATENT DOCUMENTS 7,555,231 B2 *    6/2009    Etter et al. ...................... 399/35

OTHER PUBLICATIONS

L.K. Baxter, "Capacitive Sensors" Jun. 26, 2001, located at http://www.capsense.com/capsense-wp.pdf.

* cited by examiner

*Primary Examiner* — Jermele M Hollington
*Assistant Examiner* — Farhana Hoque

(57) ABSTRACT

A circuit and system for sensing a capacitance of a capacitive sensor disposed in a toner container of an electrophotographic imaging apparatus. The circuit and system may include an AC signal generator and conversion circuitry, coupled to the capacitive sensor, for detecting an AC current appearing on the capacitive sensor and converting the detected AC current to a substantially DC voltage, relative to a local ground, the local ground serving as a ground reference for the conversion circuitry. The AC signal generator is coupled between the local ground and a system ground. Physically separating the AC signal generator from the capacitive sensor allows for parts of the capacitive sensor to be used to perform other functions in the toner container.

19 Claims, 8 Drawing Sheets

CAPACITIVE SUPPLY LEVEL SENSING CIRCUIT AND METHOD

CROSS REFERENCES TO RELATED APPLICATIONS

This application is related to U.S. patent application Ser. No. 13/340,789, filed Dec. 30, 2011, entitled "Capacitive Toner Level Sensor," the content of which is hereby incorporated by reference herein in its entirety.

STATEMENT REGARDING FEDERALLY SPONSORED RESEARCH OR DEVELOPMENT

None.

REFERENCE TO SEQUENTIAL LISTING, ETC

None.

BACKGROUND

1. Technical Field

The present disclosure relates to imaging devices. More particularly, it relates to a circuit and method for measuring toner or ink levels in the imaging unit of an imaging device.

2. Description of the Related Art

Image forming devices such as copiers, laser printers, facsimile machines and the like typically use one or more toner containers to hold toner supply used for image forming processes. In some image forming devices, a large toner supply is provided in a reservoir in a toner cartridge that mates with a separate imaging unit. The imaging unit may include a sump that holds a smaller amount of toner, enough to ensure toner is adequately supplied by a toner adder roll and a developer roll to a photoconductive drum. As toner within the imaging unit sump is depleted due to printing operations, additional toner is transferred from the toner cartridge to the imaging unit sump.

To ensure satisfactory operation of the imaging unit to transfer toner, the toner level within the imaging unit sump is maintained at a proper level. For example, if the imaging unit sump holds too much toner, toner may pack in the imaging unit sump, leak out of the ports and eventually break other components located inside and outside the imaging unit. If the toner level in the imaging unit sump gets too low, the toner adder roll may starve, causing a doctor blade of the imaging unit to film and damage the developer roll which may eventually impair the future performance of the imaging unit. As such, it is desirable to know the toner level in the imaging unit sump so as to effectively determine when to move toner from toner cartridge to the imaging unit sump.

Some methods for determining toner level in a container use estimates of toner use and accumulation based on print or time counts. However, these methods may not be accurate due to variability in factors such as the environment, developer roll age, toner patch sensing cycles, and toner transfer parameters.

Other known techniques for sensing or determining toner level include the use of electrical sensors that measure the motive force required to drive an agitator within a toner container, optical devices including mirrors and toner dust wipers in a container, and other opto-electromechanical devices such as a flag that moves with the toner level to actuate a sensor that triggers only when the volume reaches a predetermined level. Unfortunately, the addition of moving hardware increases component complexity and opportunities for errors. For instance, toner agitation may create unwanted toner dust in addition to the added complication of moving hardware.

Other techniques for sensing or determining toner level include use of a capacitive sensor disposed within a toner container, such as a waste toner container, and circuitry for sensing the capacitance of the capacitive sensor as toner levels in the container change. In one existing implementation, illustrated in FIG. 4, an AC signal generator 101 is connected to the capacitor Cx to be measured and applies a generally square wave signal thereto. Capacitor Cx couples the AC signal generator 101 to a high-pass amplifier 102 which buffers and amplifies the AC square wave signal. A synchronous rectifier 103, which is coupled to the output of the high pass amplifier 102, operates at the same frequency as AC signal generator 101 and is synchronized thereto. Synchronous rectifier 103 converts the square-wave (bipolar) signal into a unipolar signal. A low-pass filter 104 receives the unipolar signal from synchronous rectifier 103 and amplifies and smoothes the unipolar signal. Low pass filter 104 receives the filtered, unipolar signal and drives a DC output voltage Vout.

Output voltage Vout is modulated by modulator circuit 105 to a square wave at the frequency of AC signal generator 101 and synchronized thereto. The output of modulator circuit 105 is fed through a reference capacitor Cref back to the input of high pass amplifier 102. Modulator circuit 105 inverts the phase of the signal from AC signal generator 101 so that modulator circuit 105 and the AC signal generator 101 are 180 degrees out of phase with each other. The feedback loop controls output voltage Vout such that the input to high pass amplifier 102 is effectively a DC signal. In other words, the AC current through capacitor Cx is substantially balanced by the current through reference capacitor Cref. The transfer function for this circuit is:

$$Vout = V_{AC} * Cx/Cref,$$

where $V_{AC}$ is the voltage output of AC signal generator 101. With Vout, $V_{AC}$ and Cref being known values, the capacitance of capacitor Cx can be determined which is indicative of the amount of toner existing in the toner container in which capacitor Cx is disposed.

The circuit of FIG. 1 requires both terminals of capacitor Cx to float relative to ground. One terminal is referred to as the driven terminal and is connected to AC signal generator 101. The other terminal is the sense terminal and is connected to reference capacitor Cref and high-pass amplifier 102. Though the circuit of FIG. 1 has been used to effectively sense toner levels in a waste toner container by solving for capacitor Cx in the above equation, the circuit is not as robust or cost effective when used in some capacitive toner level sensing applications by, for example, requiring use of flexible circuits or the like to form the plates of capacitor Cx. Accordingly, there is a need for a more robust capacitance based toner level sensing circuit and method.

SUMMARY OF THE INVENTION

Example embodiments overcome the shortcomings of prior toner level sensing systems and thereby satisfy a significant need for a robust, capacitance-based toner level sensing system for sensing toner in a replaceable unit for an electrophotographic imaging apparatus. According to an example embodiment, there is disclosed a toner level sensing system which measures toner level in a developer unit of an imaging apparatus in part by calculating the capacitance of a capacitor located therein. In the example embodiment, the capacitor serves a dual role—in addition to serving as a capacitive sensor for determining toner levels in the developer unit having a toner sump, one plate of the capacitor also serves as a doctor blade for the developer unit. The doctor blade/capacitor plate therefore needs a drive terminal for applying a DC voltage to the capacitor to serve as a doctor blade and for applying an AC signal to determine capacitance, and a sense terminal for sensing toner levels in the toner sump of the developer unit. To also provide a robust connection for coupling an AC signal generator, needed for toner level sensing, to the capacitor, an example embodiment of the present disclosure includes coupling the AC signal generator between a system ground and a local ground, and using the local ground as the ground reference in the circuitry for determining the capacitance of the capacitor. In particular, a high pass amplifier, synchronous rectifier, low pass filter and modulator of the toner level sensing circuitry reference the local ground, with the AC signal generator of the toner level sensing circuitry being coupled between the local ground and the system ground. A sample and hold circuit, referenced to the system ground, generates an output voltage from the signal provided by the low pass filter that is based upon a ratio of the capacitor of the developer unit and a reference capacitor.

Accordingly, the toner level sensing circuitry includes an AC signal generator having a first terminal and a second terminal, the second terminal being coupled to a ground terminal of the system; and conversion circuitry having an input terminal for receiving a first signal, converting an alternating current of the first signal to a substantially DC voltage value, relative to the first terminal of the AC signal generator, and placing the substantially DC voltage value at an output terminal of the conversion circuitry. The input terminal of the conversion circuitry is coupled to a first terminal of a capacitor under test having a capacitance to be measured, and a second terminal of the capacitor under test is coupled to the ground terminal of the system. A DC voltage power supply includes a first terminal coupled to a power supply terminal of the conversion circuitry and a second terminal coupled to the first terminal of the AC signal generator. The substantially DC voltage value output value of the toner level sensing circuit is based in part upon the capacitance of the capacitor under test.

By physically separating the AC signal generator of the toner level sensing circuitry from the capacitor under test and instead coupling the capacitor under test to system ground and the AC signal generator between system ground and a local ground utilized by the conversion circuitry, a more robust and cost effective connection may be utilized between the capacitor and the capacitive toner level sensing circuitry.

The toner level sensing circuitry may further include circuitry for reducing offset voltages therein, such as by eliminating active circuits having offset voltages and generating an offset voltage for canceling a corresponding offset voltage existing in the capacitive toner level sensing circuitry.

BRIEF DESCRIPTION OF THE DRAWINGS

The above-mentioned and other features and advantages of the disclosed embodiments, and the manner of attaining them, will become more apparent and will be better understood by reference to the following description of the disclosed embodiments in conjunction with the accompanying drawings.

DETAILED DESCRIPTION

Figure 1:
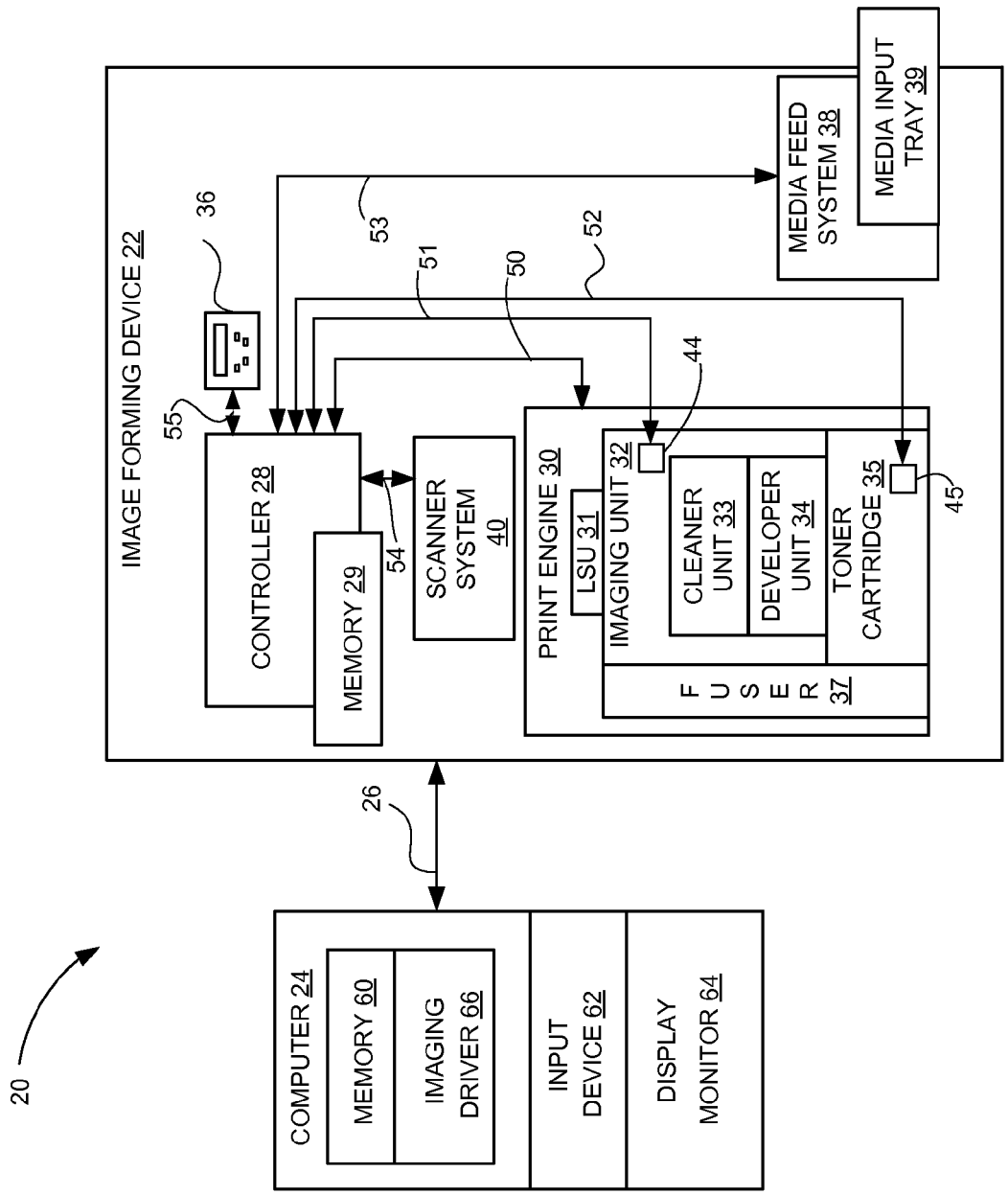
FIG. 1 is a block diagram of an example imaging system utilizing a capacitive toner level sensing system of the present disclosure.

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use herein of "including," "comprising," or "having" and variations thereof is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Spatially relative terms such as "top", "bottom", "front", "back", "rear" and "side" "under", "below", "lower", "over", "upper", and the like, are used for ease of description to explain the positioning of one element relative to a second element. These terms are generally used in reference to the position of an element in its intended working position within an imaging device. The terms "left" and "right" are as viewed with respect to the insertion direction of a unit into the imaging device. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description.

As used herein, the terms "having", "containing", "including", "comprising", and the like are open ended terms that indicate the presence of stated elements or features, but do not preclude additional elements or features. The articles "a", "an" and "the" are intended to include the plural as well as the singular, unless the context clearly indicates otherwise.

The term image as used herein encompasses any printed or digital form of text, graphic, or combination thereof. The term output as used herein encompasses output from any printing device such as color and black-and-white copiers, color and black-and-white printers, and so-called "all-in-one devices" that incorporate multiple functions such as scanning, copying, and printing capabilities in one device. The term button as used herein means any component, whether a physical component or graphic user interface icon, that is engaged to initiate output.

Referring now to the drawings and particularly to FIG. 1, there is shown a diagrammatic depiction of an imaging system 20 embodying the present disclosure. As shown, imaging system 20 may include an imaging apparatus 22 and a computer 24. Imaging apparatus 22 communicates with computer 24 via a communications link 26. As used herein, the term "communications link" is used to generally refer to structure that facilitates electronic communication between multiple components, and may operate using wired or wireless technology and may include communications over the Internet. In the embodiment shown in FIG. 1, imaging apparatus 22 is shown as a multifunction machine that includes a controller 28, a print engine 30, a laser scan unit (LSU) 31, an imaging unit 32, a developer unit 34, a toner cartridge 35, a user interface 36, a media feed system 38 and media input tray 39 and a scanner system 40. Imaging apparatus 22 may communicate with computer 24 via a standard communication protocol, such as for example, universal serial bus (USB), Ethernet or IEEE 802.xx. A multifunction machine is also sometimes referred to in the art as an all-in-one (AIO) unit. Those skilled in the art will recognize that imaging apparatus 22 may be, for example, an electrophotographic printer/copier including an integrated scanner system 40, or a standalone scanner system 40.

Controller 28 includes a processor unit and associated memory 29, and may be formed as one or more Application Specific Integrated Circuits (ASIC). Memory 29 may be any volatile or non-volatile memory or combination thereof such as, for example, random access memory (RAM), read only memory (ROM), flash memory and/or non-volatile RAM (NVRAM). Alternatively, memory 29 may be in the form of a separate electronic memory (e.g., RAM, ROM, and/or NVRAM), a hard drive, a CD or DVD drive, or any memory device convenient for use with controller 28. Controller 28 may be, for example, a combined printer and scanner controller.

In the present embodiment, controller 28 communicates with print engine 30 via a communications link 50. Controller 28 communicates with imaging unit 32 and processing circuitry 44 thereon via a communications link 51. Controller 28 communicates with toner cartridge 35 and processing circuitry 45 therein via a communications link 52. Controller 28 communicates with media feed system 38 via a communications link 53. Controller 28 communicates with scanner system 40 via a communications link 54. User interface 36 is communicatively coupled to controller 28 via a communications link 55. Processing circuit 44, 45 may provide authentication functions, safety and operational interlocks, operating parameters and usage information related to imaging unit 32 and toner cartridge 35, respectively. Controller 28 serves to process print data and to operate print engine 30 during printing, as well as to operate scanner system 40 and process data obtained via scanner system 40.

Computer 24, which may be optional, may be, for example, a personal computer, electronic tablet, smartphone or other hand-held electronics device, may include memory 60, such as volatile and/or non-volatile memory, an input device 62, such as a keyboard, and a display monitor 64. Computer 24 further includes a processor, input/output (I/O) interfaces, and may include at least one mass data storage device, such as a hard drive, a CD-ROM and/or a DVD unit (not shown).

Computer 24 includes in its memory a software program including program instructions that function as an imaging driver 66, e.g., printer/scanner driver software, for imaging apparatus 22. Imaging driver 66 is in communication with controller 28 of imaging apparatus 22 via communications link 26. Imaging driver 66 facilitates communication between imaging apparatus 22 and computer 24. One aspect of imaging driver 66 may be, for example, to provide formatted print data to imaging apparatus 22, and more particularly, to print engine 30, to print an image. Another aspect of imaging driver 66 may be, for example, to facilitate collection of scanned data.

In some circumstances, it may be desirable to operate imaging apparatus 22 in a standalone mode. In the standalone mode, imaging apparatus 22 is capable of functioning without computer 24. Accordingly, all or a portion of imaging driver 66, or a similar driver, may be located in controller 28 of imaging apparatus 22 so as to accommodate printing and scanning functionality when operating in the standalone mode.

Print engine 30 may include laser scan unit (LSU) 31, imaging unit 32, and a fuser 37, all mounted within imaging apparatus 22. The imaging unit 32 further includes a cleaner unit 33 housing a waste toner removal system and a photoconductive drum, developer unit 34 and a toner cartridge 35 that are removably mounted within imaging unit 32. In one embodiment the cleaner unit 33 and developer unit 34 are assembled together and installed into a frame 200 to form the imaging unit 32. The toner cartridge 35 is then installed over the frame in a mating relation with the developer unit 34. Laser scan unit 31 creates a latent image on the photoconductive drum in the cleaner unit 33. The developer unit 34 has a toner sump containing toner which is transferred to the latent image on the photoconductive drum to create a toned image. The toned image is subsequently transferred to a media sheet received in the imaging unit 32 from media input tray 39 for printing. Toner remnants are removed from the photoconductive drum by the waste toner removal system. The toner image is bonded to the media sheet in the fuser 37 and then sent to an output location or to one or more finishing options such as a duplexer, a stapler or hole punch.

The toner cartridge 35 removably mates with the developer unit 34 in imaging unit 32. An exit port on the toner cartridge 35 communicates with an inlet port on the developer unit 34 allowing toner to be periodically transferred from the toner cartridge 35 to resupply the toner sump in the developer unit 34.

Figure 2:
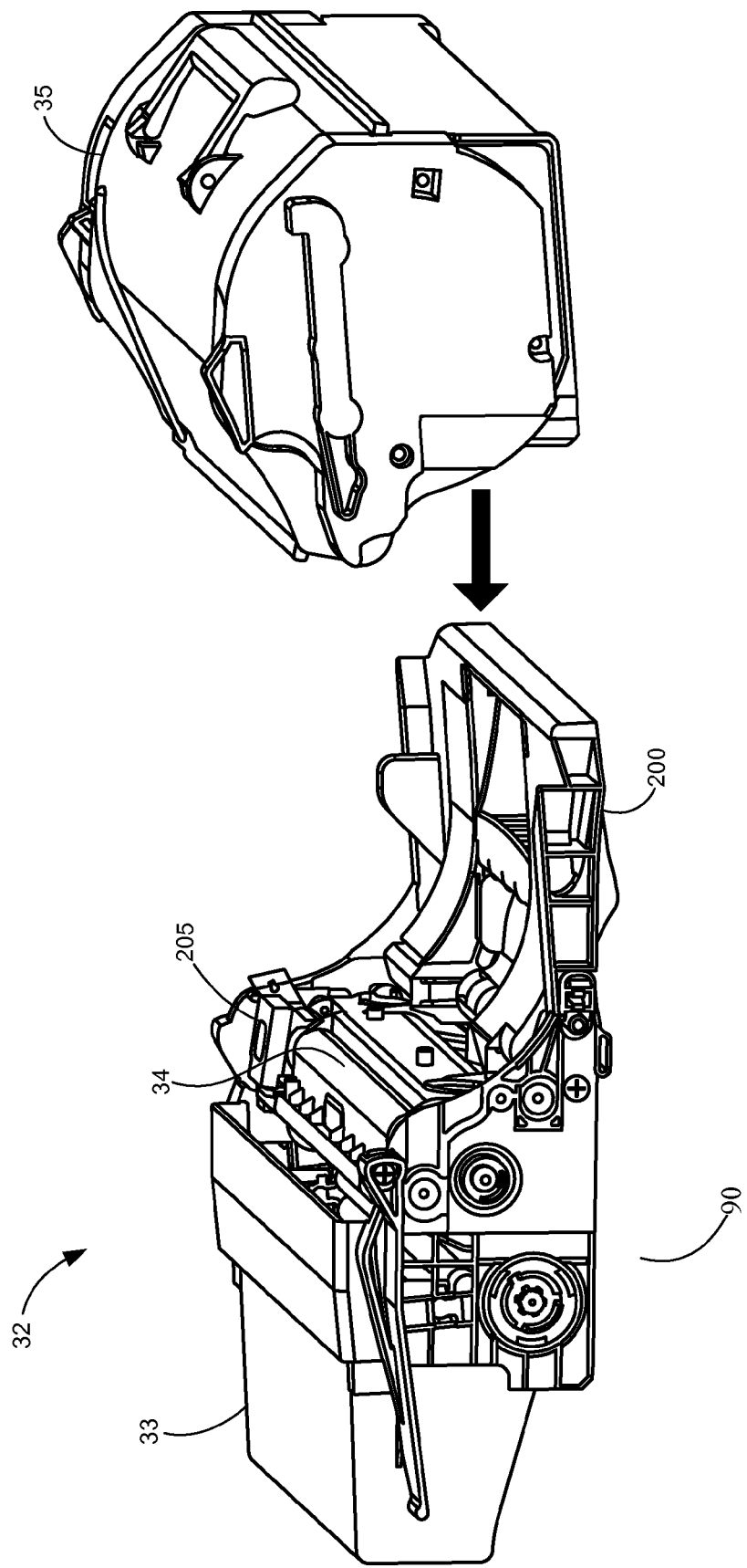
FIG. 2 is a perspective view of an imaging unit and toner cartridge of FIG. 1.

Referring now to FIG. 2, an example embodiment of the imaging unit 32 is shown. Imaging unit 32, as illustrated, includes developer unit 34, a cleaner unit 33 and housing 90 which may contain the cleaner unit 33 and developer unit 34. Developer unit 34 and cleaner unit 33 are assembled together with frame portion 200, with toner cartridge 35 being slidably received over frame portion 200. The imaging unit 32 is initially slidably received in the imaging apparatus 22. The toner cartridge 35 is then inserted in imaging apparatus 22 over frame portion 200 and into operative engagement with developer unit 34. This arrangement allows the toner cartridge 35 to be removed and reinserted easily when replacing an empty toner cartridge without having to remove imaging unit 32. Should a media jam occur beneath the imaging unit 32, both the toner cartridge 35 and imaging unit 32 may be readily removed to allow access to the media jam. The developer unit 34, cleaning unit 33 and frame portion 200 may also be readily removed and reinserted when required, however, this would normally occur with less frequency than the removal and reinsertion of toner cartridge 35.

As mentioned, the toner cartridge 35 removably mates with the developer unit 34 of imaging unit 32. An exit port (not shown) on the toner cartridge 35 communicates with an inlet port 205 on the developer unit 34 allowing toner to be periodically transferred from the toner cartridge 35 to resupply the toner sump in the developer unit 34.

Figure 3:
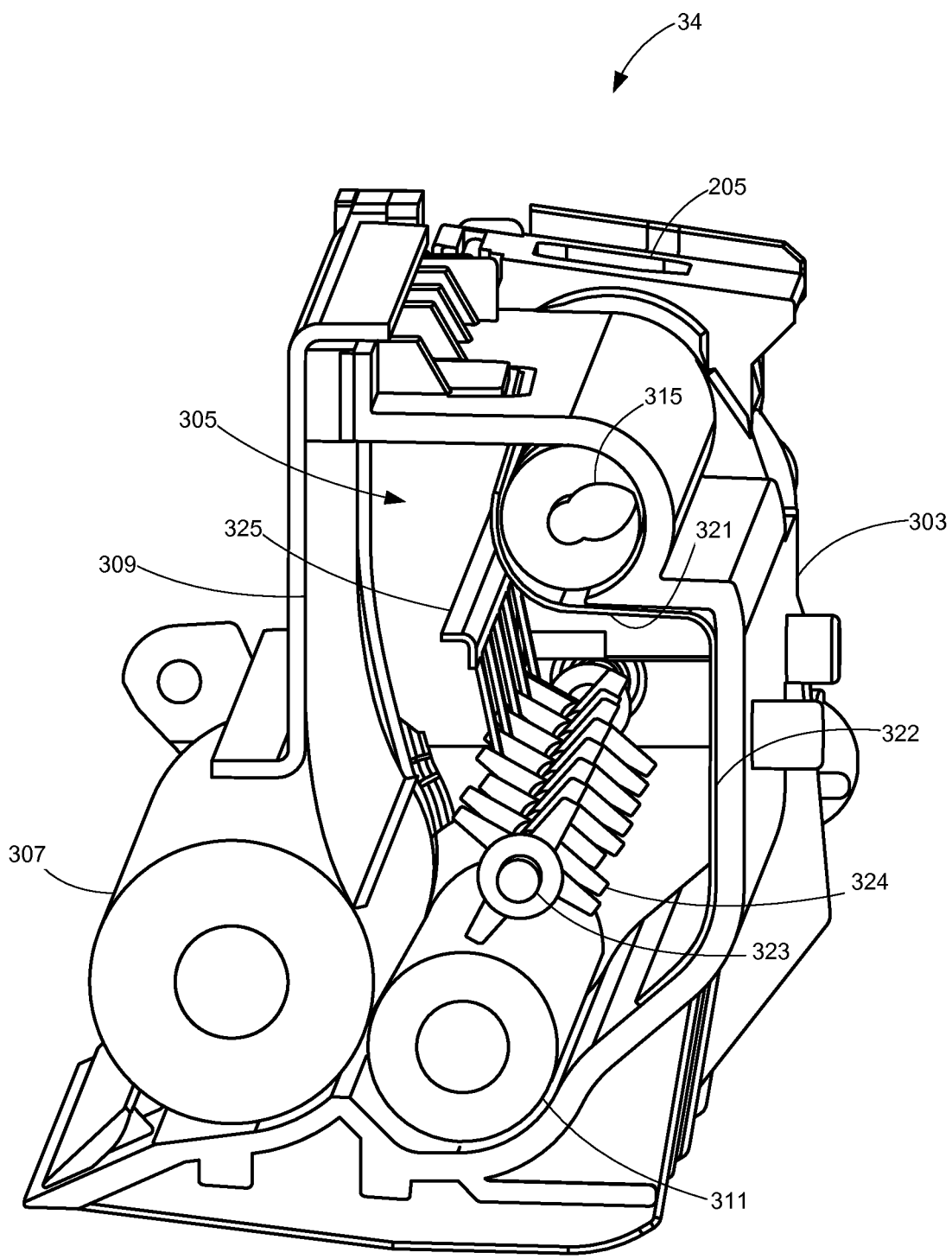
FIG. 3 is a cross-sectional view of the developer unit of the imaging unit of FIG. 2.

Referring now to FIG. 3, an example embodiment of the developer unit 34 is shown. Developer unit 34 includes a housing 303 enclosing a toner sump 305 sized to hold a quantity of toner. A developer roll 307, a doctor blade 309, and a toner adder roll 311 may be mounted within toner sump 305. The toner adder roll 311 moves the toner supplied from the toner cartridge 35 to developer roll 307 while the doctor blade 309 provides a metered, uniform layer of toner on developer roll 307. A rotating auger 315 and gutter 321 may be disposed along a side of the toner sump 305 proximal to toner inlet port 205 so as to distribute incoming toner substantially evenly across toner sump 305. A rotatable toner paddle or toner agitator 323 having one or more blades 324 may be positioned to stir and move toner within toner sump 305 to present to toner adder roll 311 and developer roll 307. In stirring and moving toner, rotating toner agitator 323 prevents toner particles from forming larger clumps within toner sump 305.

Toner inlet port 205 on housing 303 aligns with the exit port of toner cartridge 35 when toner cartridge 35 is installed along frame 200 and mated with developer unit 34. In one example form, toner inlet port 205 may be larger in area than the exit port of toner cartridge 35.

In accordance with example embodiments of the present disclosure, a toner level sensor may be positioned within the toner sump 305 for allowing for substantially continuous monitoring of the toner level therein. The toner level sensor may be implemented as a capacitive sensor. A capacitive toner level sensor serves to provide an indication of the relative toner levels contained therein. In an example embodiment, a three-plate capacitive toner level sensor is utilized. In particular, a first electrode 325 is disposed in a largely central region of toner sump 305, spanning laterally across toner sump 305. Two second electrodes are disposed along opposed sides of toner sump 305 so that the centrally disposed first electrode is positioned in between the two second electrodes. The three electrodes form the three plates of the capacitive sensor, with the two second plates being electrically connected together. In this way, the three plates form two parallel connected capacitors. In the example embodiment, the first electrode may serve as a sense plate for sensing a capacitance value, indicating toner level within toner sump 305, and the two second electrodes may be driven by a voltage during a capacitive sensing operation. A three plate capacitive sensor advantageously provides enhanced sensitivity and improved performance.

Further, the capacitive toner level sensor may be implemented using existing components of developer unit 34. For example, the capacitive sensor may utilize mechanisms used in handling or otherwise controlling movement or position of toner within the toner sump 305. In the embodiment illustrated in FIG. 3, one of the second electrodes of the capacitive sensor may be implemented using the gutter 321 and back plate 322 which is disposed along a sidewall of toner sump 305 and which may be formed with gutter 321 from a single sheet of metal. In addition, a second one of the second electrodes of the capacitive sensor may be implemented using electrically conductive doctor blade 309, which is disposed along a sidewall of toner sump 305 opposite the sidewall having back plate 322. In this arrangement, the first electrode or sense plate 325 may be disposed between the combination of gutter 321 and back plate 322 and the doctor blade 309. The sense plate 325 may be disposed adjacent the toner agitator 323 and may have one or more slots formed through a body thereof to allow the blades 324 of the toner agitator 323 to pass through when being rotated. The gutter 321, back plate 322 and the doctor blade 309 may be electrically coupled to each other and driven by a common signal source, such as an AC voltage signal source. In the alternative, the gutter 321 and back plate 322 may be electrically insulated from doctor blade 309 and driven by separate voltage signal sources. As mentioned, sense plate 325 may be used to sense or measure signals indicative of toner level.

As mentioned above, the circuit of FIG. 4 has been used to measure toner levels by measuring a capacitance of a capacitive sensor disposed in a waste toner container. Such circuit requires that the capacitor sensor be floating, i.e., have one terminal of the capacitive sensor coupled to AC signal generator 101 and a second terminal coupled to high pass amplifier 102 and reference capacitor Cref. With the circuit in FIG. 4, the capacitive sensor cannot be formed such that the driven plate thereof also serves as doctor blade 309. AC signal generator 101 must therefore drive a plate electrically isolated from but adjacent to doctor blade 109. A flex circuit can serve the purpose of being thin, electrically isolated and flexibly adhered to the doctor blade. However, a flex circuit is not cost effective and has been seen to fail when subjected to DC voltages that are typically applied to a doctor blade during normal operation of developer unit 34.

Figure 4:
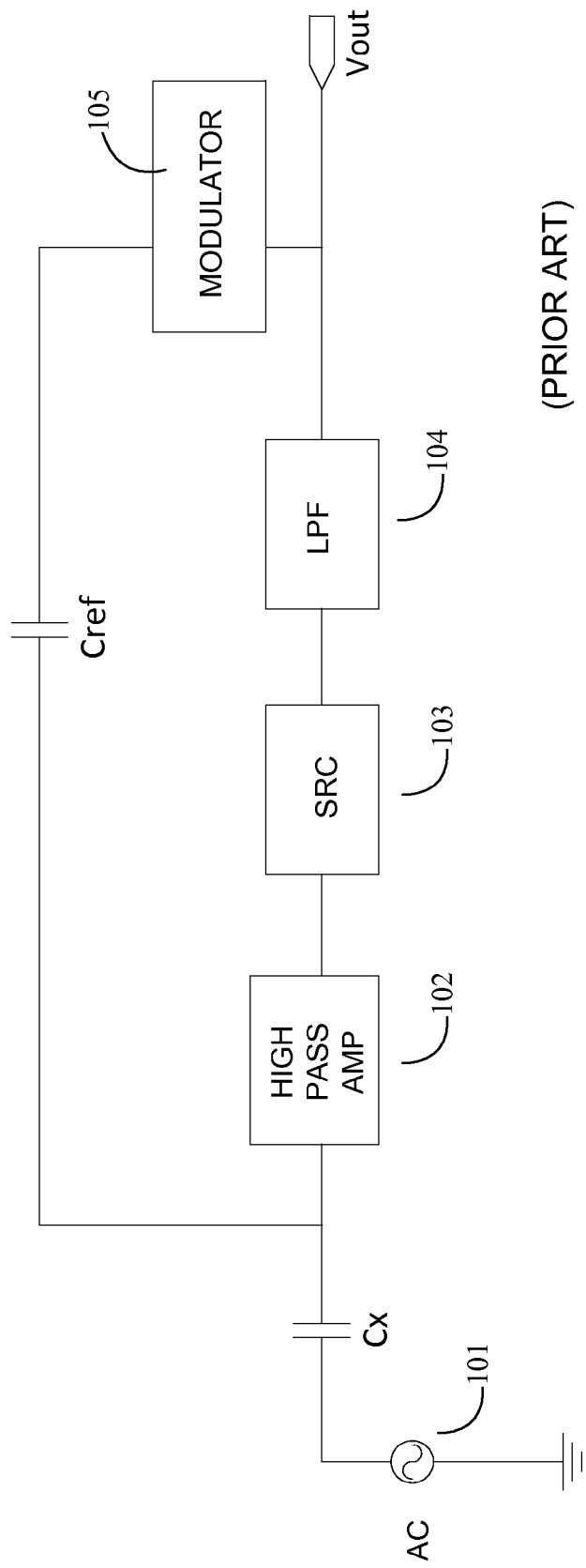
FIG. 4 is a block diagram of an existing capacitive toner level sensing circuit.
Figure 5:
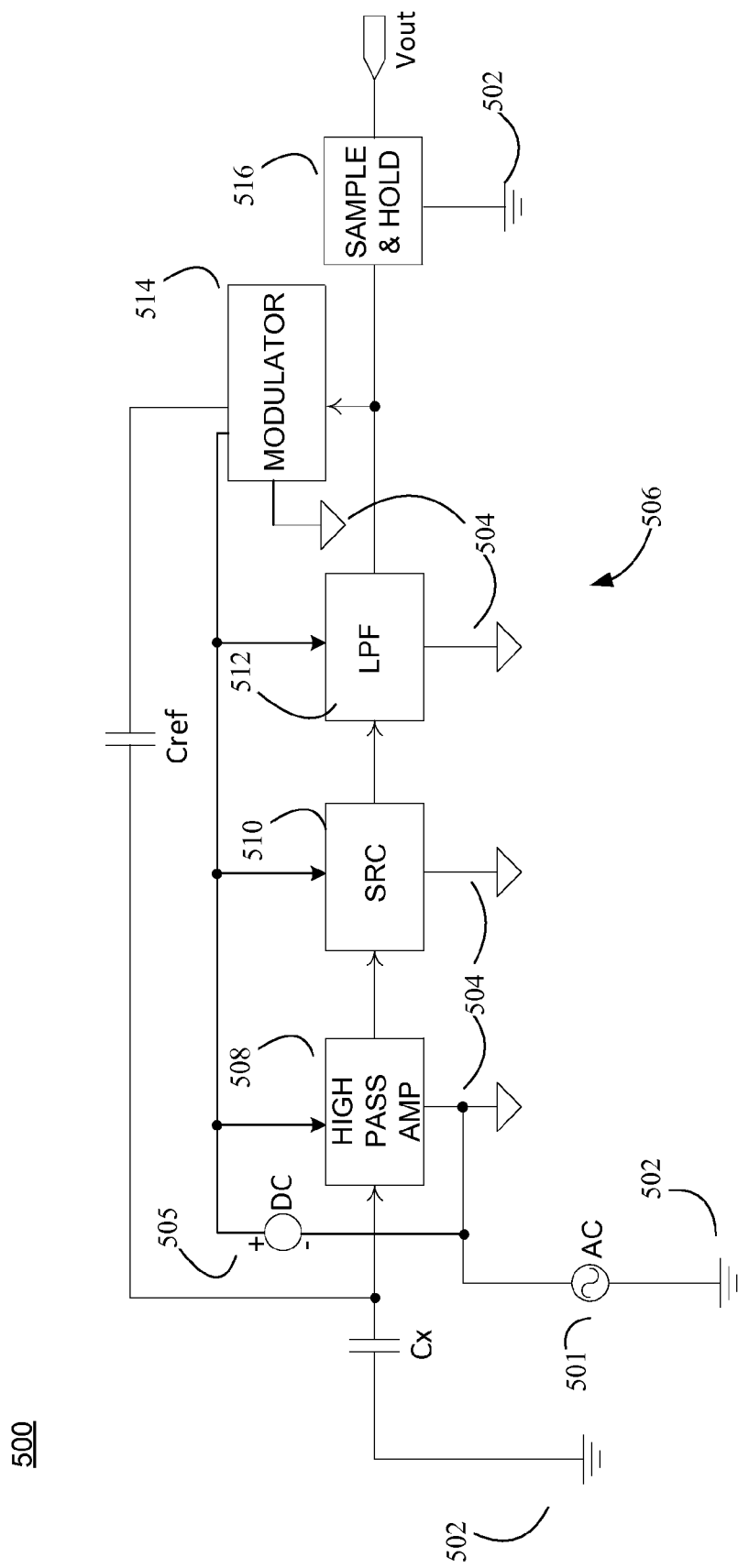
FIG. 5 is a block diagram of a capacitive toner level sensing circuit according to an exemplary embodiment.

With reference to FIG. 5, there is shown a capacitive toner level sensing system 500 according to an example embodiment. System 500 may be located, for example, in image forming device 22 and be communicatively coupled to and/or controlled by controller 28. System 500 includes an AC signal generator 501 to provide an AC excitation signal by which to determine the capacitance of capacitive sensor Cx disposed in toner sump 305. However, unlike AC excitation source 101 being coupled to capacitor Cx as in FIG. 4, AC signal generator 501 is connected between a system ground 502 and a local ground 504. Local ground 504 is used as the ground reference for conversion circuitry 506 for converting the signal appearing at its input to a DC voltage value. Because AC signal generator 501 is no longer physically connected to the capacitor whose capacitance is being measured, there is no need for an expensive flex circuit or concern of losing electrical isolation due to relatively large DC voltages being applied to doctor blade 309 breaking down the insulation. In an example embodiment, AC signal generator 501 may generate an approximately 40 kHz square wave alternating between about 0 v and about 2 v. It is understood, however, that the particular frequency, waveform shape and output voltage swings generated by AC signal generator 501 may each vary.

By utilizing local ground 504 as its ground reference and a DC power supply 505 that also references local ground 504, conversion circuitry 506 generally operates, relative to local ground 504, in much the same way the capacitive toner level sensing circuit of FIG. 4 operates.

Conversion circuitry 506 of system 500 may include a high pass amplifier 508 having an input coupled to one terminal, the sense terminal of capacitive sensor Cx, and amplifies the AC signal appearing thereon, relative to local ground 504. High pass amplifier 508 may largely resembles the high pass amplifier 102 of FIG. 4.

Conversion circuitry 506 may further include a synchronous rectifier circuit 510 having an input coupled to an output of high pass amplifier 506. Synchronous rectifier circuit 510 converts a bipolar, largely square wave signal appearing at its input to a unipolar, substantially DC voltage appearing at its output, relative to local ground 504. A low pass filter 512 includes an input coupled to the output of synchronous rectifier circuit 510, filters the signal appearing thereon, and amplifies and smoothes the signal so that its output is a DC signal, relative to local ground 504, having a level that is based at least in part upon the ratio of capacitive sensor Cx and reference capacitor Cref. Modulator circuit 514 modulates the output of low pass filter 512 and is fed back through reference capacitor Cref to the input of high pass amplifier 508. Modulator circuit 514 may be 180 degrees out of phase with respect to AC signal generator 501 so that the feedback loop of conversion circuitry 506 controls the output of low pass filter 512 such that the input to high pass amplifier 508 is substantially a DC signal, relative to local ground 504.

Capacitive toner level sensing system 500 may further include a sample and hold circuit 516 which is synchronized to AC signal generator 501, utilizes system ground 502 as its ground reference, and samples the output of low pass filter 512 when the output of AC signal generator 501 is at zero volts. As a result, the transfer function for system 500 may be seen as:

$$V\text{out}=V_{AC}*Cx/Cref,$$

where $V_{AC}$ is the output voltage of AC signal generator 501. Once Vout is measured, one can determine the present capacitance of capacitor Cx using the above equation.

As explained above, doctor blade 309 is used as at least part of the drive terminal or plate of capacitive sensor Cx. As a result, a relatively large DC voltage Vblade is applied to the drive terminal of capacitive sensor Cx during imaging. The DC voltage Vblade may be several hundred volts, such as about 900 volts DC. With the relatively high DC voltage Vblade, there has been seen a ripple voltage Vripple on the drive terminal of capacitive sensor Cx. While the DC voltage Vblade is blocked by capacitor Cx from appearing at the input of high pass amplifier 508, the AC ripple voltage Vripple is not blocked. In some instances, the peak-to-peak amplitude of ripple voltage Vripple can approach 40 volts. Most of the ripple voltage Vripple will appear directly at the input of high pass amplifier 508 and may potentially overwhelm it. Since high pass amplifier 508 is an active filter, the ripple voltage Vripple can drive the output into saturation, or even damage the amplifier. While the capacitive toner level sensing system 500 serves to reject noise that is not in phase with the signal generated by AC signal generator 501, if the amplitude of the ripple voltage Vripple, regardless of frequency, drives high pass amplifier 501 output into saturation, high pass amplifier 501 stops behaving as a linear device and its circuit function breaks down.

Figure 6:
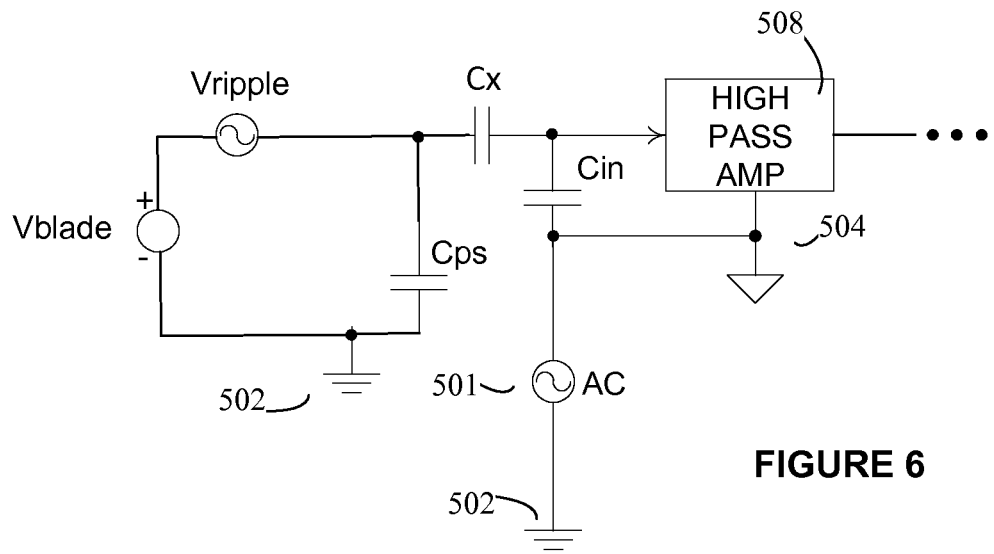
FIG. 6 is a diagram of a portion of the capacitive toner level sensing circuit of FIG. 5 in association with a DC voltage power supply.

FIG. 6 illustrates how this problem with ripple voltage Vripple arises. The doctor blade power supply's ripple voltage Vripple splits, according to the voltage divider principle, between capacitive sensor Cx and capacitor Cin where Cin represents the input capacitance of the high-pass amplifier 508. In the figure, capacitor Cps represents the output capacitance of the high voltage power supply represented by DC voltage source Vblade in series with alternating voltage source Vripple. Since input capacitance Cin is very small, almost all of the alternating voltage Vripple will drop across it, appearing at the input of high pass amplifier 508 and causing its output to saturate.

To address this effect from the ripple voltage Vripple, the value of input capacitance Cin may be modified so that most of the ripple voltage Vripple will appear across the capacitive sensor Cx, leaving only a relatively small portion across input capacitance Cin small. Unfortunately, the output of capacitive toner level sensing system 500 is sensitive to the value of input capacitance Cin, which arises from characteristics of the circuit topology thereof.

The circuit topology of capacitive toner level sensing system 500 naturally creates a feedback loop wherein offset voltages of operational amplifiers (hereinafter "op amps") therein become amplified and are fed back to their inputs in reverse polarity, cancelling them out. However, input capacitance Cin acts to shunt this offset voltage feedback to local ground 504, thereby interrupting the feedback loop. With the offset voltages no longer cancelled, they may dominate output voltage Vout of system 500, thereby rendering system 500 non-functional.

Depending upon a particular implementation of capacitive toner level sensing system 500, the offset voltages of system 500 may arise from two op amps according to commonly used circuit implementations. One op amp may be located in synchronous rectifier circuit 510 and the other op amp may be located in low pass filter 512. One possible solution is to use op amps having very low offset voltages, but such devices are relatively expensive.

Another solution is to separately address each op amp in synchronous rectifier circuit 510 and low pass filter 512. There are known implementations of synchronous rectifier circuits, some using a single op amp and others using two op amps, in which offset voltage exists. Other known implementations using signal processing circuitry having balanced modulators or multipliers, but such implementations are disadvantageously more expensive.

Figure 7:
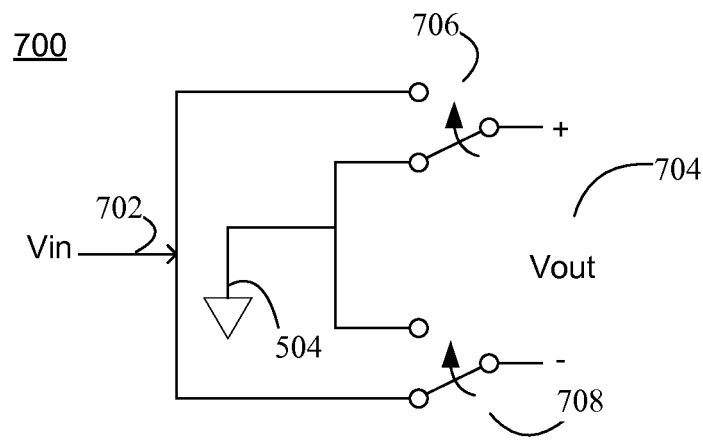
FIG. 7 is diagram illustrating an implementation of a synchronous rectifier circuit of FIG. 5 according to an exemplary embodiment.

FIG. 7 illustrates a synchronous rectifier circuit 700 according to an example embodiment. Synchronous rectifier circuit 700 may include an input 702 for receiving an input voltage signal Vin and a differential output 704 for providing an output voltage signal Vout. Coupled between input 702 and output 704 are a pair of switches 706 and 708. Each switch 706, 708 may be a single pole, double throw (SPDT) switch which selectively connects to a distinct output terminal of differential output 704 input voltage signal Vin and local ground reference 504. Switches 706 and 708 may be synchronized to AC signal generator 501 such that while one of switches 706, 708 is connected to input voltage signal Vin the other of switches 706, 708 is connected to local ground reference 504. A benefit of synchronous rectifier circuit 700 is that there is no op-amp offset voltage.

It is understood that synchronous rectifier circuit 700 may be implemented with switches other than SPDT switches. For example, each SPDT switch 706, 708 may be implemented using a pair of single pole, single throw (SPST) switches, as shown in FIG. 9.

Figure 8:
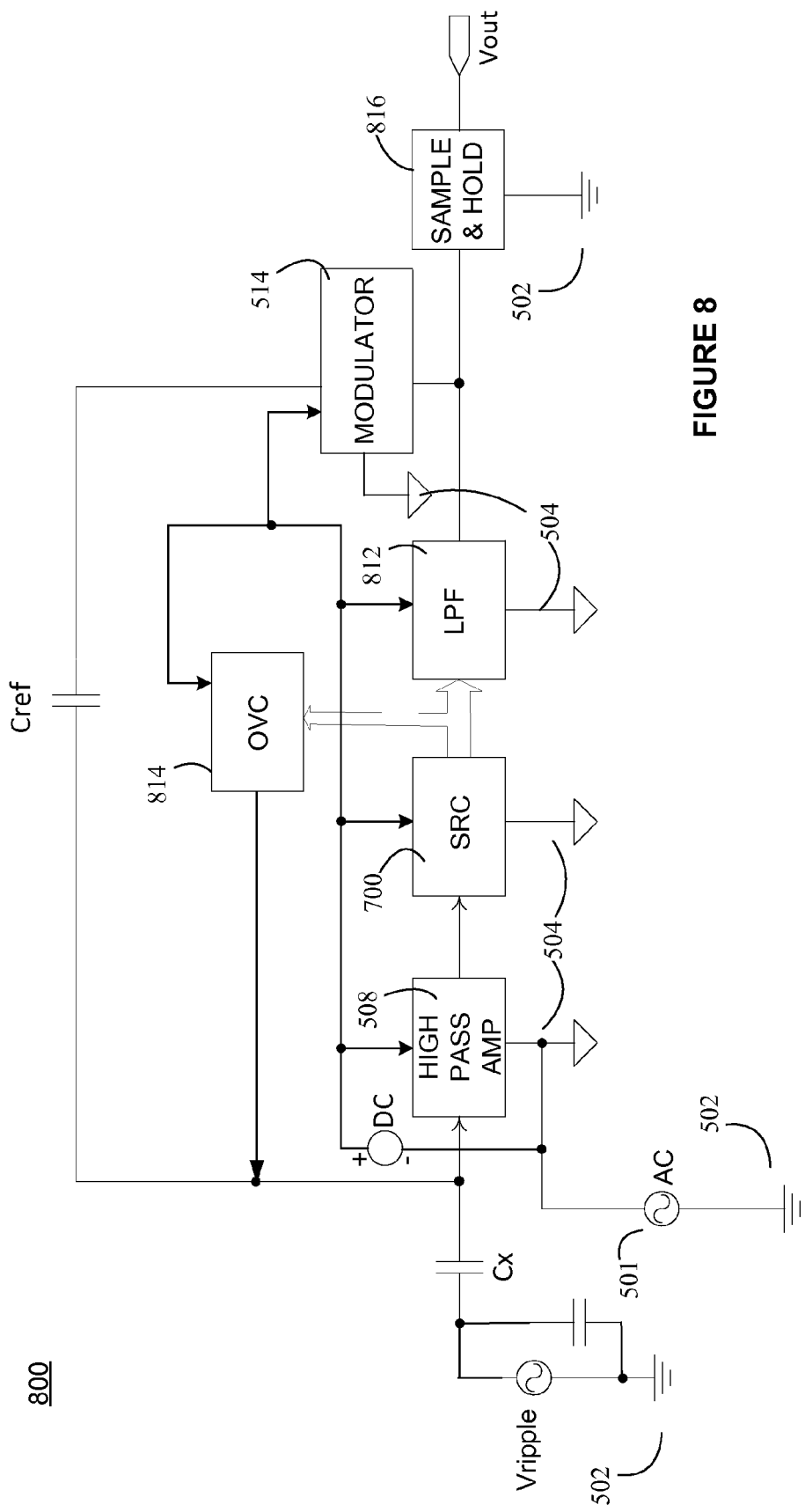
FIG. 8 is a block diagram of a capacitive toner level sensing circuit according to another exemplary embodiment.

FIG. 8 illustrates a capacitive toner level sensing system 800 according to an example embodiment. Capacitive toner level sensing system 800 includes synchronous rectifier circuit 700 of FIG. 7. Further, capacitive toner level sensing system 800 may include low pass filter 812 having a differential input for receiving the differential output of synchronous rectifier circuit 700 of FIG. 7. In addition, capacitive toner level sensing system 800 may include an offset voltage cancellation circuit 814 which measures the offset voltage of the op amp of low pass filter 812, modulates it in sync with the AC signal generator 501, and feeds the measured offset voltage back to the input of high pass amplifier 508. The measured offset voltage is then demodulated by synchronous rectifier circuit 700 and appears at the input of low pass filter 812 with an opposite polarity of the offset voltage thereof. By configuring the loop gain of offset voltage cancellation circuit 814, high pass amplifier 508 and synchronous rectifier circuit 700 to be about −1, the offset voltage of low pass filter 812 is substantially cancelled.

Figure 9:
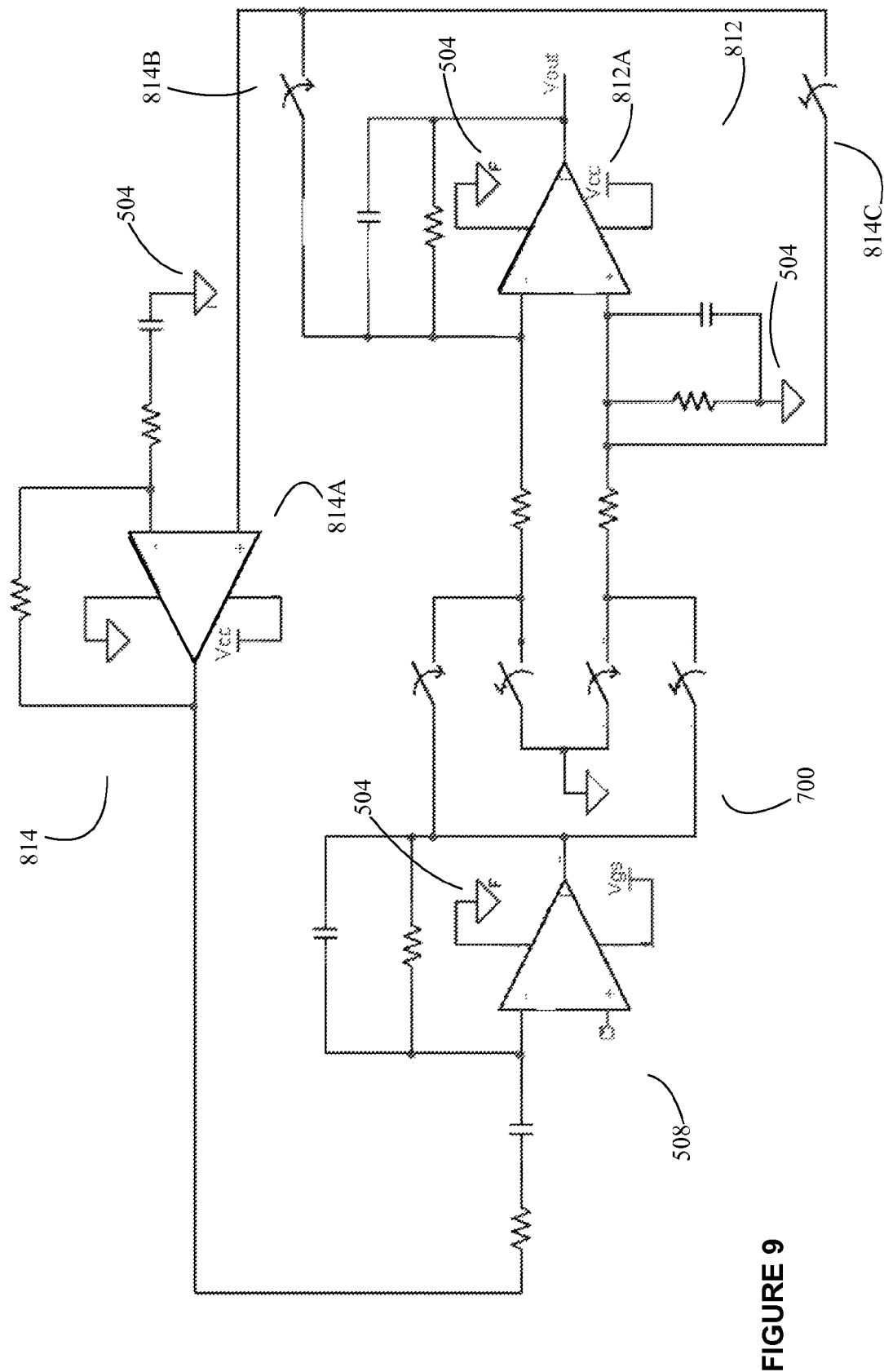
FIG. 9 is a circuit diagram illustrating an implementation of a portion of the capacitive toner level sensing circuit of FIG. 8 according to an example embodiment.

An example implementation of offset voltage cancellation circuit 814 appears in FIG. 9, which also shows example circuit implementations for high pass amplifier 508, synchronous rectifier circuit 700, and low pass filter 812. In accordance with an example embodiment, offset voltage cancellation circuit 814 may include an op amp 814A configured as a high pass filter with a pass band gain of about two and a DC gain of about one. Switches 814B and 814C alternatingly connect each of the differential input terminals of the op amp 812A of low pass filter 812 to the non-inverting input of op amp 814A of offset voltage cancellation circuit 814. In particular, switches 814B and 814C switch synchronously with the signal of AC signal generator 501. As a result, the voltage at the input of op amp 814A may be a substantially square wave with an amplitude substantially equal to the offset voltage of op amp 812A combined with a DC voltage level, and the voltage at the output of op amp 814A may be the offset voltage of op amp 812A amplified by about two and combined with the DC voltage level.

In considering the voltage offset cancellation loop including voltage cancellation circuit 814 (AC gain of about two and DC gain of about one), high pass amplifier 508 (AC gain of about −1 and DC gain of zero) and synchronous rectifier circuit 700 (AC gain of about one half), the total loop AC gain is about −1. This results in an inverted version of the offset voltage being applied to the input of low pass filter 812, thereby substantially cancelling the offset voltage thereof. With the offset voltage related errors now substantially removed from capacitive toner level sensing system 800, input capacitance Cin of high pass amplifier 508 may be made large enough to reduce the amount of ripple voltage Vripple, generated from the DC high voltage supply for driving doctor blade 309, to an acceptable level across input capacitance Cin.

It is understood that capacitive toner level sensing systems 500 and 800 may be used to measure the capacitance of capacitive sensors found in devices other than electrophotographic imaging devices.

The foregoing description of several methods and an embodiment of the invention have been presented for purposes of illustration. It is not intended to be exhaustive or to limit the invention to the precise steps and/or forms disclosed, and obviously many modifications and variations are possible in light of the above teaching. It is intended that the scope of the invention be defined by the claims appended hereto.

What is claimed is:

1. A capacitance measuring system, comprising:
   an AC signal generator having a first terminal and a second terminal, the second terminal coupled to a ground terminal of the system; and
   conversion circuitry having an input terminal and an output terminal, for converting an AC current through the input terminal to a substantially DC voltage value, relative to the first terminal of the AC signal generator, and placing the substantially DC voltage value at an output terminal of the conversion circuitry, the input terminal for coupling to a first terminal of a capacitor under test having a capacitance to be measured, a second terminal of the capacitor under test for coupling to the ground terminal of the system;
   wherein the conversion circuitry includes a first supply terminal for coupling to a DC voltage supply and a second supply terminal coupled to the first terminal of the AC signal generator, and wherein the substantially DC voltage value is based in part upon a capacitance of the capacitor under test.

2. The system of claim 1, wherein the conversion circuitry comprises a synchronous rectifier circuit having an input coupled to the input terminal of the conversion circuitry and a differential output, the synchronous rectifier circuit comprising switching circuitry for switching a voltage appearing at the input of the synchronous rectifier between terminals of the differential output thereof, wherein a terminal of the differential output not currently connected to the input of the synchronous rectifier being coupled to the second supply terminal of the conversion circuitry.

3. The system of claim 2, wherein the switching circuitry is synchronized with the AC signal generator.

4. The system of claim 1, wherein the conversion circuitry further comprises a low pass filter having a differential input for receiving a differential signal, and the system further comprises circuitry, coupled to the differential input of the low pass filter, for reducing an offset voltage thereof.

5. The system of claim 4, wherein the conversion circuitry further comprises an input amplifier having an input coupled to the input terminal of the conversion circuitry, and the circuitry for reducing offset voltage comprises an amplifier having an input coupled to the differential input of the low pass filter and an output coupled to the input terminal of the conversion circuitry and switching circuitry coupled between the input of the amplifier of the circuitry for reducing offset voltage and the low pass filter, the switching circuitry being synchronized with the AC signal generator.

6. The system of claim 5, wherein an AC loop gain through the circuitry for reducing offset voltage and the input amplifier to the input of the low pas filler is about −1.

7. The system of claim 5, wherein the switching circuitry of the circuitry for reducing offset voltage alternates between providing to the amplifier thereof a first input of the differential input of the low pass filter and a second input of the differential input thereof.

8. The system of claim 5, further comprising a sample-and-hold circuit having an input coupled to an output of the low pass filter, the sample-and-hold circuit being synchronized to the AC signal generator and having a ground terminal coupled to the ground terminal of the system, the sample-and-hold circuit providing a second substantially DC voltage value, relative to the ground terminal of the system, that is based in part upon a capacitance of the capacitor under test.

9. A capacitance measuring system, comprising:
   an AC signal generator having a first terminal and a second terminal, the second terminal coupled to a ground terminal of the system;
   conversion circuitry having an input terminal for receiving a first signal, the conversion circuitry converting an alternating current of the first signal to a substantially DC voltage value, relative to a local ground reference, and placing the substantially DC voltage value at an output terminal of the conversion circuitry, the input terminal for coupling to a first terminal of a capacitor under test having a capacitance to be measured, a second terminal of the capacitor for coupling to the ground terminal of the system; and
   wherein the local ground reference is coupled to the first terminal of the AC signal generator, and the substantially DC voltage value is based in part upon a capacitance of the capacitor under test.

10. The system of claim 9, wherein the conversion circuitry includes a synchronous rectifier circuit having an input coupled to the input terminal of the conversion circuitry and a differential output, the synchronous rectifier circuit having substantially no offset voltage.

11. The system of claim 10, wherein the synchronous rectifier circuit comprises switching circuitry alternatingly coupling each output terminal of the differential output of the synchronous rectifier circuit to the input thereof, the output terminal of the differential output not coupled to the input of the synchronous rectifier circuit being coupled to the local ground reference.

12. The system of claim 11, wherein the switching circuitry is synchronized to the AC signal generator.

13. The system of claim 9, wherein the conversion circuitry further comprises a filter having a differential input, and wherein the system further comprises circuitry for reducing an offset voltage of the filter, comprising an amplifier and switching circuitry synchronized with the AC signal generator for selectively coupling each terminal of the differential input of the filter to an input of the amplifier, an output of the amplifier being coupled to the input terminal of the conversion circuitry.

14. The system of claim 13, wherein the conversion circuitry includes an input amplifier having an input coupled to the input terminal of the conversion circuitry and an output, and a synchronous rectifier circuit having an input coupled to the output of the input amplifier and a differential output coupled to the differential input of the filter, and wherein the circuitry for reducing an offset voltage, the input amplifier and the synchronous rectifier circuit have a combined AC gain of about 1.

15. The system of claim 9, further comprising sample and hold circuitry having an input coupled to the output terminal of the conversion circuitry, the sample and hold circuitry using the ground terminal of the system as a ground reference and being synchronized with the AC signal generator.

16. A system for calculating a level of a consumable material in a container having a capacitive sensor therein, comprising:

an AC signal generator; and conversion circuitry having an input terminal coupled to the capacitive sensor and an output terminal, the conversion circuitry detecting at the input terminal an AC current appearing on the capacitive sensor, converting the detected AC current to a substantially DC voltage, relative to a local ground, the local ground serving as a ground reference for the conversion circuitry, and placing the substantially DC voltage at the output terminal;

wherein the AC signal generator includes a first terminal coupled to the local ground and a second terminal coupled to a system ground such that the AC signal generator is coupled between the local ground and the system ground, and wherein the capacitive sensor is coupled between the first terminal of the conversion circuitry and the system ground.

17. The system of claim 16, further comprising a sample and hold circuit having an input coupled to the output terminal of the conversion circuitry and an output providing a substantially DC voltage level that is based in part upon a capacitance of the capacitive sensor, the system ground serving as a ground reference for the sample and hold circuit.

18. The system of claim 16, wherein the conversion circuitry includes a synchronous rectifier circuit, the synchronous rectifier circuit comprising switching circuitry without amplifier circuitry, the switching circuitry being synchronized to the AC signal generator.

19. The system of claim 16, wherein the conversion circuitry comprises at least one amplifier circuit having a voltage offset, and wherein the system further comprises voltage cancelling circuitry for cancelling the voltage offset of the at least one amplifier circuit.

* * * * *